United States Patent
Gongola et al.

(10) Patent No.: US 9,829,191 B2
(45) Date of Patent: Nov. 28, 2017

(54) ELEVATED RUNWAY/TAXIWAY FIXTURE AND GLOBE/GLASS HEATER

(71) Applicant: Cooper Technologies Company, Houston, TX (US)

(72) Inventors: Paul John Gongola, Enfield, CT (US); John Brian Schneider, West Springfield, MA (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 305 days.

(21) Appl. No.: 14/658,605

(22) Filed: Mar. 16, 2015

(65) Prior Publication Data

US 2016/0273754 A1    Sep. 22, 2016

(51) Int. Cl.
| | |
|---|---|
| F21V 33/00 | (2006.01) |
| F21V 29/90 | (2015.01) |
| F21V 3/04 | (2006.01) |
| H05B 3/84 | (2006.01) |
| B64F 1/20 | (2006.01) |
| H05B 3/12 | (2006.01) |
| F21W 111/06 | (2006.01) |
| F21Y 115/10 | (2016.01) |

(52) U.S. Cl.
CPC ............... *F21V 29/90* (2015.01); *B64F 1/20* (2013.01); *F21V 3/0418* (2013.01); *H05B 3/84* (2013.01); *F21W 2111/06* (2013.01); *F21Y 2115/10* (2016.08); *H05B 3/12* (2013.01); *H05B 2203/014* (2013.01)

(58) Field of Classification Search
CPC ....................................................... F21V 29/90
See application file for complete search history.

(56) References Cited

U.S. PATENT DOCUMENTS

| | | | |
|---|---|---|---|
| 3,686,473 A | 8/1972 | Shirn et al. | |
| 6,601,983 B1 | 8/2003 | Runfola et al. | |
| 7,192,155 B2 | 3/2007 | Morrow et al. | |
| 7,914,162 B1 * | 3/2011 | Huang | B60L 1/14 |
| | | | 219/220 |
| 2003/0121906 A1 | 7/2003 | Abbott et al. | |
| 2007/0121329 A1 | 5/2007 | Morrow et al. | |
| 2011/0080097 A1 | 4/2011 | Morrow | |
| 2011/0180824 A1 | 7/2011 | Tan et al. | |
| 2013/0094192 A1 | 4/2013 | De Boeck et al. | |
| 2014/0268647 A1 | 9/2014 | Blondin et al. | |

(Continued)

OTHER PUBLICATIONS

International Search Report and Written Opinion of Corresponding Application No. PCT/US2016/022610; dated Jun. 23, 2016.

*Primary Examiner* — Evan Dzierzynski
(74) *Attorney, Agent, or Firm* — Pearne & Gordon LLP

(57) ABSTRACT

A light fixture is provided with a heating element. The heating element can be a resistive heating element, such as a Nichrome wire, and resides in grooves of a cover (e.g., a glass globe) of the light fixture. Thus, the heating element acts to directly heat the cover of the light fixture to prevent, decrease, or otherwise correct frosting, freezing, and other elemental effects on the cover when it is exposed to the environment. The heating element is capable of raising the temperature of the cover at least 15° C. from an initial temperature of −20° C. in 30 minutes. A heat sensing element may provide feedback regarding the temperature of the cover for controlling power supplied to the heating element.

15 Claims, 3 Drawing Sheets

(56) References Cited

U.S. PATENT DOCUMENTS

2014/0355238 A1* 12/2014 Huang .................... F21K 9/56
                                                            362/84
2015/0055363 A1    2/2015   Van Straten

* cited by examiner

ELEVATED RUNWAY/TAXIWAY FIXTURE AND GLOBE/GLASS HEATER

BACKGROUND OF THE INVENTION

The application described herein is directed to a light fixture and, more particularly, to a runway/taxiway light fixture in which the globe or glass lens of the light fixture is heated.

Light fixtures located in harsh environments, for example, those located outdoors on runways/taxiways are subject to conditions that can diminish or prevent the proper operation of the light fixture. For example, in cold climates, the globe or glass lens of the light fixture may frost or otherwise have ice formed thereon. As a result, emitted light from the light fixture cannot sufficiently penetrate the globe or glass lens or, in doing so, is altered, thereby impairing the function of the light fixture. When interior temperatures are cold enough, the light fixture may suffer from similar problems even when it is located inside a closed structure.

BRIEF SUMMARY OF THE INVENTION

Accordingly, the application herein describes a more efficiently heated fixture.

According to one example, a light fixture comprises a first power element and a second power element; a lighting element powered by the first power element; a cover; and a heating element powered by the second power element, wherein the heating element is provided in grooves along a bottom surface of the cover for heating the cover, and an electrically insulating material is provided between the cover and the heating element.

In various embodiments of the above example, the light fixture further comprises a heat sensing element, wherein a feedback signal from the heat sensing element is used to control the heating element via the second power element; the heat sensing element is a thermistor or thermocouple interior to the cover; the light fixture is an elevated runway or taxiway light fixture; the cover is a glass globe; the heating element is a Nichrome wire; and/or the heating element is capable of raising the temperature of the cover at least 15° C. from an initial temperature of −20° C. in 30 minutes.

According to another example, a runway and/or taxiway light fixture comprises a base; a lighting element secured to the base; a cover having a resistive heating element; and a heat sensing element; wherein the cover is secured to the base, the cover and base encapsulate the lighting element, the resistive heating element generates heat via power from a power element and is provided in grooves of a surface of the cover with an electrically insulating material provided between the surface of the cover and the heating element, and the heat sensing element is provided on the interior of the fixture.

In various embodiments of the above example, a feedback signal from the heat sensing element is used to control the heating element via control of the power element; the heat sensing element is a thermistor or thermocouple; the cover is glass globe; the resistive heating element is a Nichrome wire; the heating element is capable of raising the temperature of the cover at least 15° C. from an initial temperature of −20° C. in 30 minutes; the lighting element is a light emitting diode; and/or the surface of the cover is a bottom surface and the cover is securely engaged to the base along the bottom surface of the cover, such that the heating element is secured in the grooves at least in part by the base.

DETAILED DESCRIPTION OF THE INVENTION

Light fixtures useful for runway/taxiway illumination are described herein, however the description of them relative to runways and taxiways merely represents an exemplary embodiment and is not intended to be limiting. That is, the various aspects described herein are applicable to other objects providing other functions in which it is desired to heat a part of a surrounding encasement. For example, the light fixture may be elevated or in-ground. In other examples, the various aspects described herein may be applicable to any form of electromagnetic-wave-transmitting-devices used for other functions, such as roadway lighting or the lamps/lenses of lighthouses.

It is further noted that the various aspects described herein are sufficient to satisfy the requirements of optional arctic kits as set forth in Federal Aviation Administration (FAA) Engineering Brief EB67D. Specifically, sections 2.13 and 2.13.1 of EB67D are directed to optional arctic kits, and provide that any fixture may have arctic kits for addressing potential icing conditions and that the arctic kits must be self-activating. Brief EB67D further requires the main beam light emitting surface (e.g. a fixture cover) temperature must rise a minimum of 15° C. from −20° C. after 30 minutes operation in still air with the light source activated at the highest intensity setting.

Current arctic kits utilize heating elements that heat the air located inside the fixture. However, the subsequent heat transfer between the heating element, air, and fixture cover can be inefficient with respect to required power and time. In contrast, the fixture described herein heats the fixture cover directly by providing the heating element inside grooves on a surface the cover.

Figure 1:
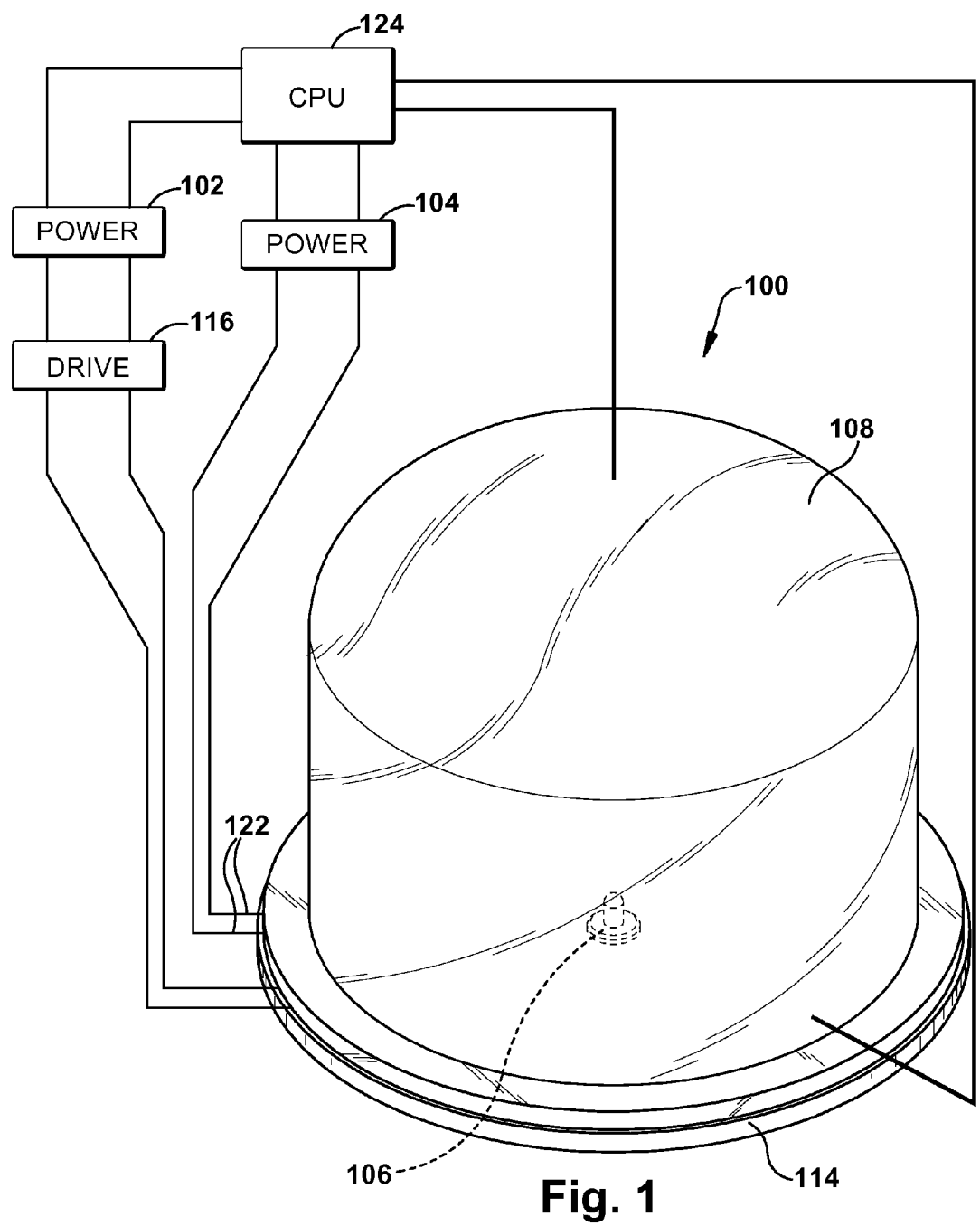
FIG. 1 is a perspective view of an elevated runway/taxiway fixture.

Turning now to a description of the figures, FIG. 1 illustrates a perspective view of an elevated runway/taxiway fixture. The fixture can include at least one power element 102, 104, a lighting element 106 (not explicitly shown in FIG. 1), a cover 108, a heating element 110 (not shown in FIG. 1), a heat sensing element (not shown), and a base 114. The power element(s) 102, 104 may be, for example, a battery included in the fixture, other direct current power source (such as a generator), alternating current power source (such as a line voltage), and the like. The lighting element 106 may be, for example, a light emitting diode (LED), incandescent light bulb, florescent light bulb, and the like for emitting a light from the fixture. The lighting element 106 may be mounted on the base 114 and powered by the power element 102. Some embodiments may also include a drive element 116 that supplies a proper voltage and current to the lighting element 106 based on the voltage and current from the power element 102. In embodiments where the power element 102 is externally located, power may be supplied to the drive element 116 or lighting element 106 via power cables.

Figure 4:
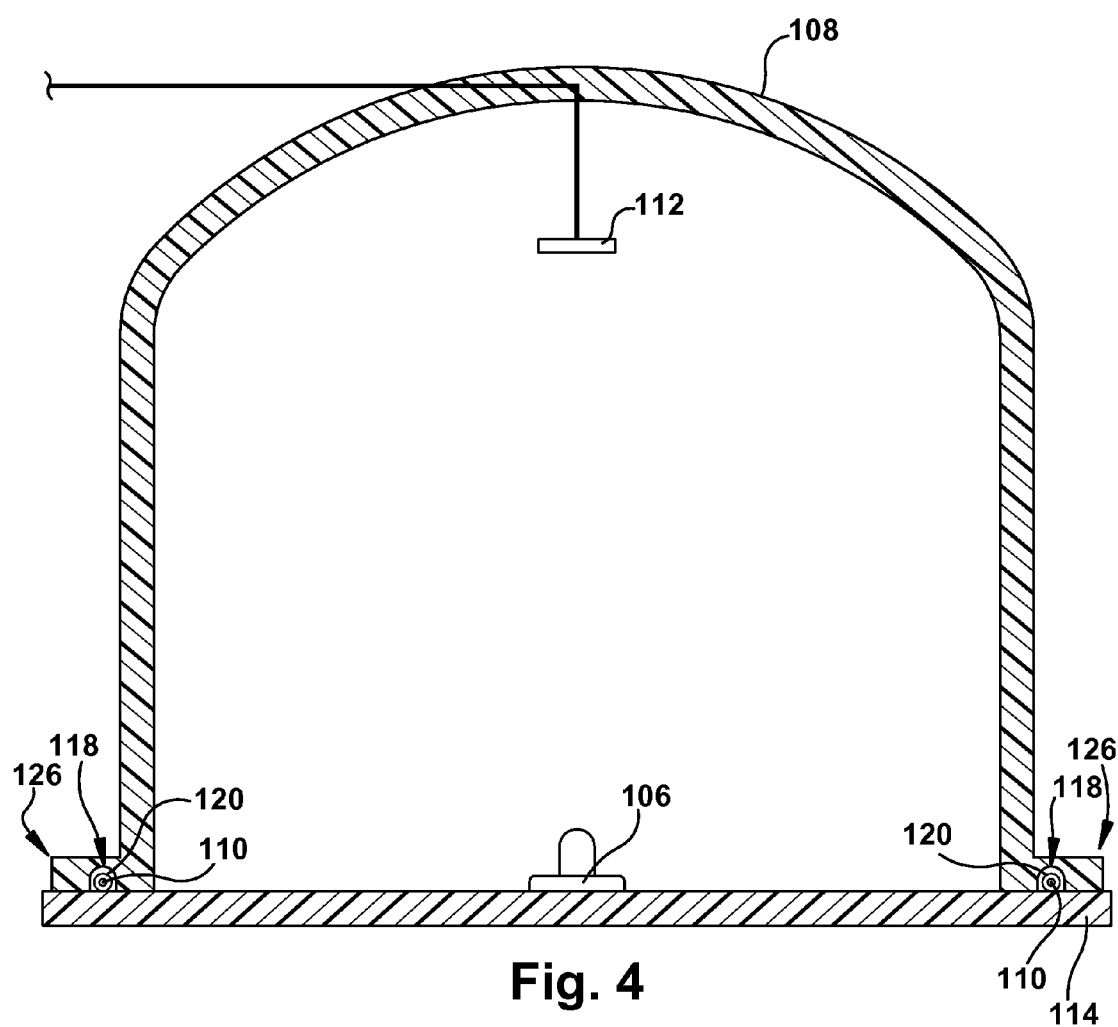
FIG. 4 is a cross-section view of an elevated runway/taxiway fixture.

The cover 108 protects and encapsulates the lighting element 106 and may be mounted to the base 114. As illustrated in FIGS. 1 and 4, the cover 108 may resemble a globular like shape, however, any shape may be suitable. The cover 108 may be made of any number of materials, for example, glass or polymers, that allow light emitted from the lighting element 106 to be transmitted from the fixture 100. In some embodiments, the cover 108 may have light transmitting properties, for example, diffracting and/or reflecting properties.

The heating element 110 (e.g., Nichrome wire) resides in a groove 118 (e.g., round, square, rectangular, triangular) or multiple electrically isolated grooves 118 in the cover 108. There may also be a non-conductive or electrically insulating material 120 between the groove(s) 118 and any electrically conductive material of the heating element 110. The ends of the heating element can be attached to flexible insulated leads 122, which connect to the power element 104. The power element 104 may be the same power element that powers the lighting element 106, or a different power element separate from the existing power element 104.

The heating element 110 is, for example, a resistive heating element that generates and dissipates heat based on a supplied electrical voltage and current. In one embodiment, Nichrome wire may be used as the heating element 110. The heating element 110 is used to heat the cover 108 of the fixture 100. For example, rather than heating an interior air volume inside the fixture 100 (e.g., encapsulated by the cover 108 and base 114), which is then transferred to the cover 108 itself, the heating element 110 substantially directly heats the cover 108.

The amount of required heat can be controlled by varying length (e.g., continuously, forming a spiral, and double backed), finished shape (round, square, rectangular), and/or diameter or area of the heating element 110.

The heat sensing element 112 may be, for example, a thermistor or thermocouple as part of a feedback control system for the heating element 110. As illustrated in FIG. 4, the heating sensing element 112 is interior to the cover 108, to take into account interior heat generating sources. In various other embodiments, the heat sensing element 112 may be attached to inner and outer surfaces of the cover 108 to provide temperature information relating to the part of the fixture 100 exposed to environmental elements. While FIG. 4 only illustrates the heat sensing element 112 interior to the cover 108, it is to be noted that the heat sensing element 112 may be at any one, or a combination, of locations.

The heat sensing element 112 may be electrically connected to a processor 124 for measuring and providing a temperature of the fixture interior to the processor 124. The processor 124 may then be used to control the output of the power element 102, 104 and/or the drive element 116, thereby controlling the heating element 110. For example, if the heat sensing element 112 indicates that a pre-determined temperature of the fixture interior is so low as to allow freezing, frosting, and the like to the cover 108, a user may be alerted to the issue by a display or sound generated by the processor 124. The user may then cause the processor 124 to control and increase the voltage and/or current of the power element 102, 104 and/or driver 114 to a level sufficient to cause the heating element 110 to increase the temperature of the cover 108 to an acceptable level in a desired time period. As discussed above, these temperatures and time periods may be defined by FAA EB67D. Similarly, the processor 124 may be used to control on/off and other lighting functions of the lighting element 106.

The function of the processor 124 may also perform in accordance with FAA EB67D, which requires that light fixtures be self-activating. For example, the heat sensing element 112 may provide feedback to the processor 124, where the processor 124 automatically controls the power element(s) 102, 104 for the lighting element 106 and the heating element 110. In this way, when the heat sensing element 112 senses that a temperature on a surface of the cover 108 is below a predetermined threshold, the heating element 110 may be automatically powered to prevent the cover 108 from frosting or icing, or to defrost/deice the cover.

Figure 2:
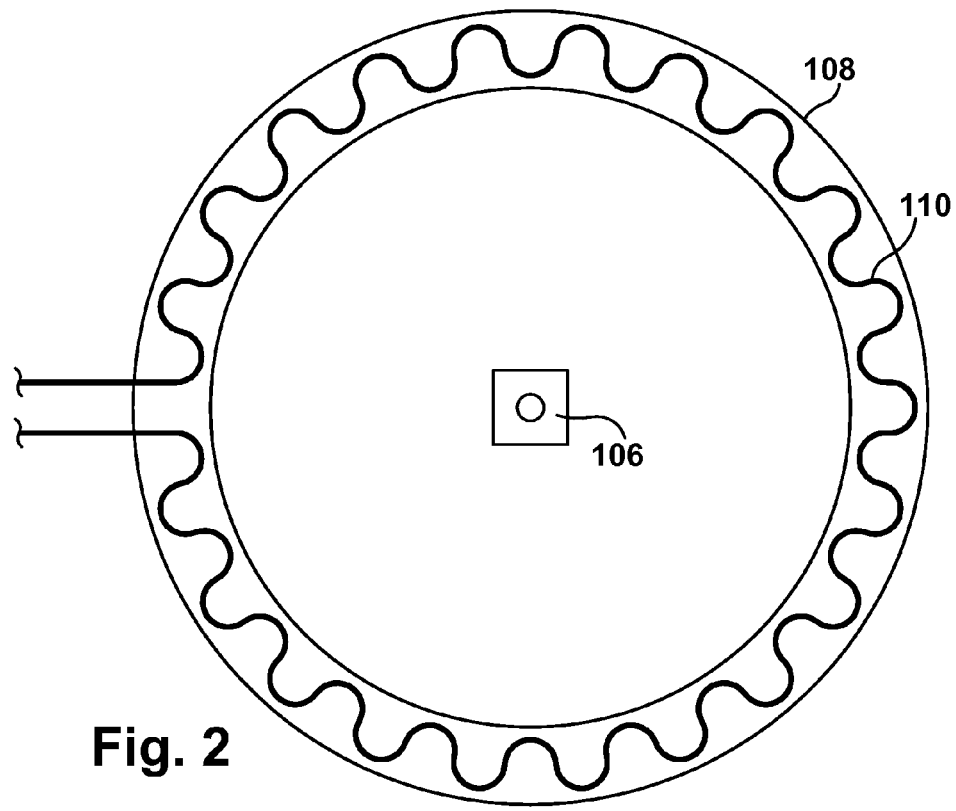
FIG. 2 is a bottom view of an elevated runway/taxiway fixture according to an embodiment.
Figure 3:
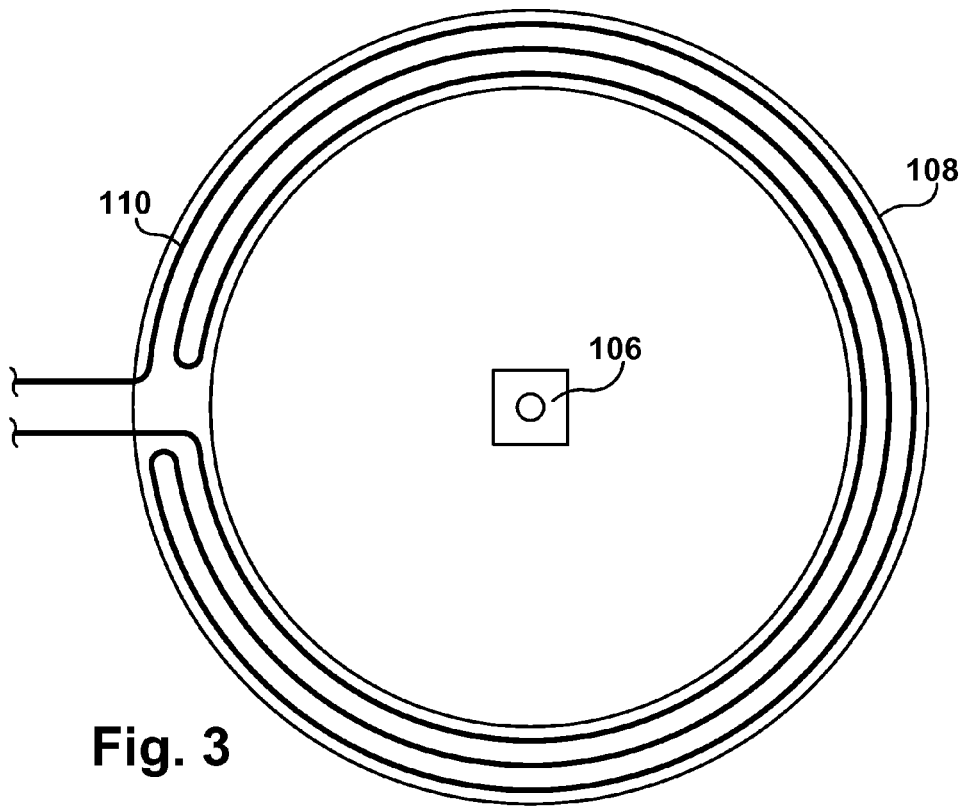
FIG. 3 is a bottom view of an elevated runway/taxiway fixture according to an embodiment.

FIGS. 2 and 3 illustrate bottom views of the fixture 100 and the application of the heating element 110 in grooves 118 of the cover 108. That is, FIGS. 2 and 3 illustrate the heating element 110 as a Nichrome wire fitted into etchings 118 (or similarly formed grooves) on the bottom of the cover 108. In FIG. 2, the heating element 110 is formed in a continuous spiral-shaped groove 118 in the bottom of the cover 108. In FIG. 3, the heating element 110 is formed in a double-backed manner. While FIGS. 2 and 3 illustrate the heating element 110 in grooves 118 along the bottom of the cover 108, it is to be understood that the grooves 118 may be located anywhere on the cover 108.

FIG. 4 illustrates a cross-section of the fixture 100. The lighting element 106 is located near the center of the base 114. Grooves 118 are shown along the bottom of the cover 108. The heating element 110 (illustrated as a wire) is located in the grooves 118 and is encased by an electrically non-conductive material. The heating element 110 may be secured in the grooves 118, for example, with an adhesive. Alternatively, the heating element 110 may be secured in the grooves 118 by attachment of the cover 108 to the base 114. As noted above, heat sensing elements 112 are illustrated attached to an inner surface of the cover 108 and interior to the cover 108.

As discussed above, the cover 108 in FIGS. 1-4 is formed as a globe like shape, with an outwardly protruding rim 126. The grooves 118 are provided along a bottom surface of the rim 126. The bottom surface of the rim 126 is also where the cover 108 may be secured to the base 114, as discussed above. While a partial-globular shape of the cover has been described herein, it is to be understood that the cover 108 may take any shape that is conducive to perform as described. Furthermore, the grooves 118 provided in the cover (and the heating element 110 provided therein) may be applied at any location on the cover 108.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

What is claimed is:
1. A light fixture comprising:
a first power element and a second power element;
a lighting element powered by the first power element;
a cover; and
a heating element powered by the second power element, wherein the heating element is provided in grooves along
 a bottom surface of the cover for heating the cover, and
 an electrically insulating material is provided between
  the cover and the heating element.

2. The light fixture according to claim 1, further comprising a heat sensing element, wherein a feedback signal from the heat sensing element is used to control the heating element via the second power element.

3. The light fixture according to claim 2, wherein the heat sensing element is a thermistor or thermocouple interior to the cover.

4. The light fixture according to claim 1, wherein the light fixture is an elevated runway or taxiway light fixture.

5. The light fixture according to claim 1, wherein the cover is a glass globe.

6. The light fixture according to claim 1, wherein the heating element is a Nichrome wire.

7. The light fixture according to claim 1, wherein the heating element is capable of raising the temperature of the cover at least 15° C. from an initial temperature of −20° C. in 30 minutes.

8. A runway and/or taxiway light fixture comprising:
a base;
a lighting element secured to the base;
a cover having a resistive heating element and a heat sensing element,
wherein the cover is secured to the base,
the cover and base encapsulate the lighting element,
the resistive heating element generates heat via power from a power element and is provided in grooves of a surface of the cover with an electrically insulating material provided between the surface of the cover and the heating element, and
the heat sensing element is provided interior to the cover.

9. The light fixture according to claim 8, wherein a feedback signal from the heat sensing element is used to control the heating element via control of the power element.

10. The light fixture according to claim 8, wherein the heat sensing element is a thermistor or thermocouple.

11. The light fixture according to claim 8, wherein the cover is glass globe.

12. The light fixture according to claim 8, wherein the resistive heating element is a Nichrome wire.

13. The light fixture according to claim 8, wherein the heating element is capable of raising the temperature of the cover at least 15° C. from an initial temperature of −20° C. in 30 minutes.

14. The light fixture according to claim 8, wherein the lighting element is a light emitting diode.

15. The light fixture according to claim 8, wherein the surface of the cover is a bottom surface and the cover is securely engaged to the base along the bottom surface of the cover, such that the heating element is secured in the grooves at least in part by the base.

\* \* \* \* \*